US012786040B2

(12) United States Patent
Smith et al.

(10) Patent No.: US 12,786,040 B2
(45) Date of Patent: Nov. 3, 2026

(54) DEVICE MANAGEMENT SYSTEM MIGRATION

(71) Applicant: Ivanti, Inc., South Jordan, UT (US)

(72) Inventors: Brett Smith, West Jordan, UT (US); Greg Pola, Concord, CA (US); Michael Nielson, South Jordan, UT (US); Christopher Achilli, South Jordan, UT (US); Thom Allen, South Jordan, UT (US)

(73) Assignee: Ivanti, Inc., South Jordan, UT (US)

( * ) Notice: Subject to any disclaimer, the term of this patent is extended or adjusted under 35 U.S.C. 154(b) by 15 days.

(21) Appl. No.: 18/964,376

(22) Filed: Nov. 30, 2024

(65) Prior Publication Data

US 2025/0184209 A1 Jun. 5, 2025

Related U.S. Application Data

(60) Provisional application No. 63/605,206, filed on Dec. 1, 2023.

(51) Int. Cl.
*H04L 41/044* (2022.01)
*H04L 41/0803* (2022.01)

(52) U.S. Cl.
CPC ........ *H04L 41/044* (2013.01); *H04L 41/0803* (2013.01)

(58) Field of Classification Search
None
See application file for complete search history.

(56) References Cited

U.S. PATENT DOCUMENTS

| | | | | |
|---|---|---|---|---|
| 8,850,423 | B2 | 9/2014 | Barkie et al. | |
| 12,519,840 | B1 * | 1/2026 | Abotchie | H04L 63/20 |
| 2015/0081887 | A1 * | 3/2015 | Kalkunte | H04L 41/0816 709/224 |
| 2019/0173805 | A1 * | 6/2019 | Balan | H04L 41/0886 |
| 2021/0026895 | A1 * | 1/2021 | Banerjee | H04L 41/0843 |

(Continued)

OTHER PUBLICATIONS

"Mobile device management". Posted at <https://en.wikipedia.org/wiki/Mobile_device_management> on Nov. 26, 2023 (Year: 2023).*

(Continued)

*Primary Examiner* — Scott B Christensen

(57) ABSTRACT

A method of device management system migration includes scraping device and group structure data from a first system implemented to manage a network of devices. The group structure data is indicative of an arrangement of the devices. The method includes identifying device groups. The method includes building a network model representative of the arrangement. The network model substantially replicates the device groups. The method includes populating the second system with the device groups. The method includes generating an exportable data file based on the device data. The method includes communicating the exportable data file such that the second system organizes the managed devices into the migrated device groups of the second system. The method includes causing a provisioning of the devices into the second system such that the devices establish communication with the second system and receive management configurations consistent with the migrated device groups.

20 Claims, 10 Drawing Sheets

(56) References Cited

U.S. PATENT DOCUMENTS

| | | | | |
|---|---|---|---|---|
| 2021/0119874 | A1* | 4/2021 | Ryman | H04L 67/025 |
| 2022/0103433 | A1* | 3/2022 | Akhilesham | H04L 41/0897 |
| 2022/0350631 | A1* | 11/2022 | Parry-Barwick | G06F 9/45558 |
| 2023/0246907 | A1* | 8/2023 | Reutova | H04L 41/0816 709/220 |

OTHER PUBLICATIONS

International Search Report and Written Opinion for Application No. PCT/US2024/058003, dated Feb. 28, 2025, 15 pages.

Hwang, et al., "Cloud Transformation Analytics Services a Case Study of Cloud Fitness Validation for Server Migration," 2015 IEEE International Conference on Services Computing, Jun. 27, 2015, pp. 387-394.

International Search Report and Written Opinion for Application No. PCT/US2024/058003, dated Jun. 2, 2026, 11 pages.

* cited by examiner

DEVICE MANAGEMENT SYSTEM MIGRATION

CROSS-REFERENCE TO RELATED APPLICATION

This application claims priority to and the benefit of U.S. Provisional Patent Application No. 63/605,206, filed Dec. 1, 2023, which is incorporated herein by reference in its entirety.

FIELD

The embodiments described in this disclosure are related to device management system migration.

BACKGROUND

Mobile device management and enterprise mobility management (collectively, MDM) is implemented to ensure mobile devices that are enrolled in a network are secured and to control resources and applications available at the mobile devices. Some MDM services also troubleshoot technical issues experienced by the mobile devices.

In conventional MDM systems, one or more centralized devices (e.g., servers, management computing devices, or cloud-management devices) access data related to the mobile devices and their management. The data includes device attributes, user credentials, locational information of the mobile devices, application policies, device parameters, enterprise configuration policies, user role information, enterprise resource information, vulnerability and security settings, etc. The centralized devices execute control operations on the mobile devices using the data. At least some of the control operations occur in real time and/or on an on-going schedule. Accordingly, the centralized devices host the data used in the management of the mobile devices.

The data may be formatted according to an MDM system implemented by the centralized devices. For instance, a first MDM system may format the data to enable a particular functionality while a second MDM system may format the data for integration into a particular user interface. The format of the data may prevent or impede migration between MDM systems. For instance, migration operations may involve manually identifying device attributes, manually building device groups, re-organizing the mobile devices prior to enrollment into a new MDM system. The migration process may last weeks or months. Additionally, migration between MDM systems leaves a time during which at least some of the mobile devices are not managed. For instance, some migrations involve a removal of at least some of the mobile devices from a first MDM system during at least some of the migration process. During this period, these mobile devices are not controlled, which may result in vulnerability penetration at the mobile devices and uncontrolled access to network resources. Accordingly, a need exists to improve MDM system migration to automate data reformat and to ensure continuous MDM during the migration process.

The subject matter claimed herein is not limited to embodiments that solve any disadvantages or that operate only in environments such as those described. Rather, this background is only provided to illustrate one example technology area where some embodiments described herein may be practiced.

SUMMARY

An aspect of an embodiment includes a method of device management system migration. The method may include scraping device data and group structure data from a first system. The first system may be implemented to at least partially manage a network of managed devices. Management of the network may be being transitioned from the first system to a second system. The group structure data may be indicative of an arrangement and organization of the managed devices in the network. The method may include identifying device groups of the network based on the group structure data. The method may include building a network model. The network model may be representative of the arrangement of the network based on the identified device groups. The network model may replicate or substantially replicate the device groups of the network. The method may include populating the second system with the device groups of the network model such that the second system includes two or more migrated device groups that correspond to the identified device groups of the first system. The method may include generating an exportable data file based on the device data. The exportable data file may include a device group identifier for each of the managed devices. The method may include communicating the exportable data file to the second system such that the second system organizes the managed devices into the migrated device groups of the second system according to the device group identifiers. The method may include causing a provisioning of the managed devices into the second system such that each of the managed devices establishes communication with the second system and receives management configurations from the second system consistent with the migrated device groups into which the managed device is included.

Another aspect of an embodiment includes a non-transitory computer-readable medium having encoded therein programming code executable by one or more processors to perform or control performance of any combination of the operations of the method of device management system migration described above.

Yet another aspect of an embodiment includes device or system comprising one or more processors and a non-transitory computer-readable medium having encoded therein programming code executable by one or more processors to perform or control performance of any combination of the operations of the method of device management system migration described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

The embodiments described in this disclosure are related to device management system migration. Some embodiments relate to migration operations implemented by a migration system to transfer management of a managed network of devices from a first system to a second system.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
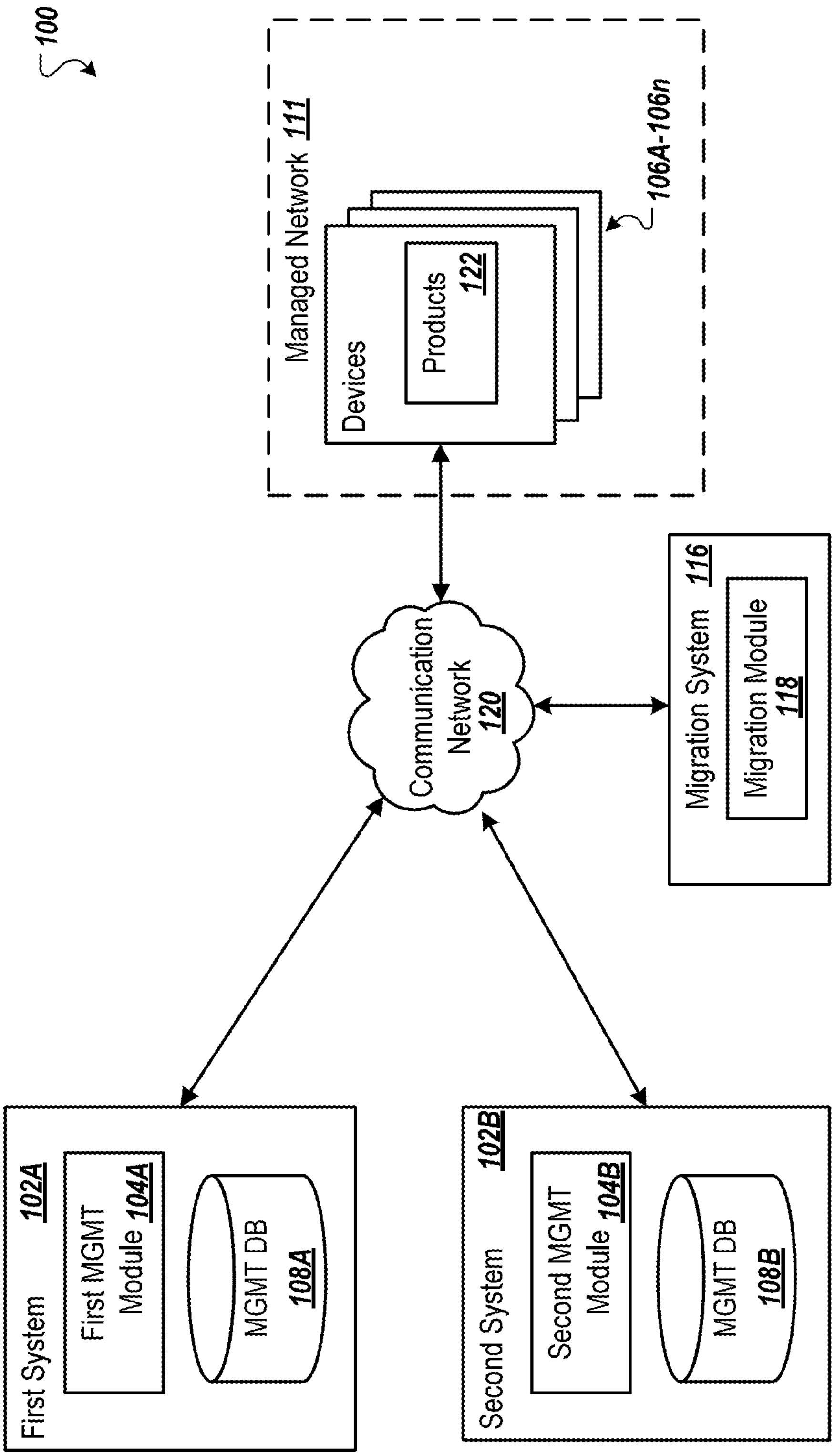
FIG. 1 depicts a block diagram of an example operating environment in which some embodiments of the present disclosure may be implemented.

FIG. 1 is an example operating environment 100 in which some embodiments of the present disclosure may be implemented. In the operating environment 100, management of a managed network 111 may be transitioned from a first system 102A to a second system 102B. A portion of the transition from the first system 102A to the second system 102B is migration of management data. For instance, management of the network 111 may include identification and/or generation of an inventory of managed devices 106A-106*n* (generally, managed device 106 or devices 106). The inventory may include information associated with the devices 106. Additionally, management of the network 111 may include grouping the devices 106 according to a parameter or criteria of a subset of the devices 106 or the managed network 111. The management data may include information related to or describing device groups. Additionally still, group-specific management configurations may be implemented, which may dictate functions and operations of subsets of the devices 106 in the device groups. Accordingly, the management data may include device data and group structure data.

Prior to the transition, management data representative of the device data and the group structure data may be stored in a management database 108A of the first system 102A. To enable the transition to the second system 102B, the management data is migrated to the second system 102B. In the operating environment 100, a migration module 118 of the migration system 116 may be implemented to perform one or more data migration processes to migrate the management data from the first system 102A to the second system 102B. The migration module 118 may be configured to build a network model that replicates or substantially replicates an arrangement of the network 111. The second system 102B is populated with the network model and the management data of the first system 102A prior to provisioning the devices 106 such that the second system 102B can implement management operations.

The migration module 118 and processes implemented by the migration module 118 may improve conventional systems and data migration processes implemented in conventional systems. For instance, in conventional systems, migration of the management data is a largely manual process performed by the second system 102B. The data migration accordingly consumes resources, delays the migration, introduces errors, and leaves a period of time in which the devices 106 are not managed or at least not fully managed during the transition. For instance, in a conventional transition, the second system 102B may be tasked with management of the network 111. For a period of time, the second system 102B sorts the management data, determines device groups, determines group-specific configurations, etc. while it manages the network 111. Accordingly, at least some of the group-specific configurations are not in place during this time period. Moreover, during the transition, one or more of the devices 106 may not be known by the second system 102B. Thus, these devices 106 may not be managed during this time period. Accordingly, embodiments of the present disclosure enable data migration without or with a minimal time period in which the devices 106 are not managed or not completely managed. For instance, the devices 106 may only be unmanaged during the time period necessary to perform a provision operation such as a reboot operation or another local provisioning operation implemented by the devices 106.

The operating environment 100 of FIG. 1 includes the managed network 111 that includes the devices 106. Management of the managed network 111 may be transitioned from the first system 102A to the second system 102B. The migration system 116 is implemented to perform data migration operations and processes that enable the management transition from the first system 102A to the second system 102B. In the operating environment 100, data and information are communicated between the migration system 116, the first and second systems 102A and 102B and the managed network 111 via a communication network 120. Each of these components of the operating environment 100 are introduced in the following paragraphs.

The communication network 120 may include one or more wide area networks (WANs) and/or local area networks (LANs) that enable the first and second systems 102A and 102B, the migration system 116, and the devices 106 to communicate with each other. In some embodiments, the communication network 120 may include the Internet in which communicative connectivity between first and second systems 102A and 102B, the migration system 116, and the devices 106 is formed by logical and physical connections between multiple WANs and/or LANs. Additionally or alternatively, the communication network 120 may include one or more cellular radio frequency (RF) networks, one or more wired networks, one or more wireless networks (e.g., 802.xx networks), Bluetooth access points, wireless access points, Internet Protocol (IP)-based networks, or any other wired and/or wireless networks. The communication network 120 may also include servers that enable one type of network to interface with another type of network.

The managed network 111 is implemented to enable management of the devices 106 by the first or second systems 102A and 102B. To implement the managed network 111, the devices 106 may be enrolled or provisioned. After the devices 106 are enrolled or provisioned, ongoing management of the devices 106 may be implemented by the first or second systems 102A and 102B. The ongoing management may include overseeing and dictating at least a part of the operations at the devices 106 as described in the present disclosure. For instance, the devices 106 may be mobile devices operating in an enterprise network. The ongoing management may include providing and enforcing security policies (e.g., firewalls, application management, virtual private network (VPN) configuration, and the like), application management (role-based, enterprise based, or otherwise), update and patch management, and the like.

The devices 106 may include hardware-based computer systems that are configured to communicate with the other components of the operating environment 100 via the communication network 120. The devices 106 may include any computer device that may be managed by the first or second systems 102A or 102B and/or have been enrolled in the managed network 111. Generally, the devices 106 include computing devices that are operated by the personnel and systems of an enterprise or store data of the enterprise. The devices 106 might include workstations of an enterprise, servers, data storage systems, printers, telephones, internet of things (IoT) devices, smart watches, sensors, battery charging devices, scanner devices, rugged devices, etc. The devices 106 may also include virtual machines, which may include a portion of a single processing unit or one or more portions of multiple processing units, which may be included in multiple machines.

The devices 106 include products 122. The products 122 may include applications, components, systems, drivers, of any kind or type. Some examples of the products 122 may include software applications, enterprise software, operating systems, hardware components, installed printers, memory locations, utilized monitors, ports, plug-ins, services, network communication components, the device 106 itself (or information related thereto), similar computer-related features or components, or combinations thereof. The products 122 may differ between the devices 106.

In some embodiments, the devices 106 might also include an agent. In some embodiments, the management modules 104A and 104B may interface with the agent. For instance, the agent may have a high level of privilege on the device 106, which enables visibility to the products 122 as well as operational parameters related to or characterizing the device 106. The agent may be configured to exist on the devices 106 to support ongoing management thereof.

The first system 102A and the second system 102B (collectively, manager systems 102) may include one or more hardware-based computing systems. The manager systems 102 may include management modules 104A and 104B configured to perform management operations relative to the managed network 111. For instance, the management modules 104 may be configured to inventory the devices 106, which may identify the products 122 and status thereof, and associate device parameters and device properties with the devices 106. The device parameters may include a device name, a device serial number, a device manufacturer, a device location, a device asset tag, a device product, a device record, other device parameters, or combinations thereof.

Additionally, the management modules 104A and 104B may configure functionality of the devices 106. In some embodiments, the devices 106 are clustered into device groups. The device groups may include a subset of the devices 106 that share a parameter or criteria and are similarly managed. The management modules 104A and 104B may generate and implement group-specific management configurations for the device groups. The group-specific management configurations may include commands and settings that dictate, at least partially, the function of the subset of devices 106 in a particular device group.

The device groups and the management configurations may be customized to the managed network 111. For instance, the managed network 111 may be spread across multiple locations in some embodiments. In these and other embodiments, a subset of the devices 106 in each device group may include the devices 106 at each of the locations. The subset of the devices 106 at each location may represent a device group. The management modules 104A and 104B may implement management configurations for each location and accordingly each device group.

An example of the management configurations may include a role-based configuration such as a security setting relative to enterprise resources that are based on a role of a user of one of the devices 106. Another example of the management configurations may include a geography-based configuration such as limiting network access to the devices 106 within a geographic location. Another example of the management configurations may include a device-based configuration such as enabling network access to resources by particular device types. Another example of the management configurations may include use of a particular version or configuration of an application or one of the products 122 running on the devices 106 or remotely accessed via one of the products 122. In particular, the managed network 111 may include a supply-chain network operating in a warehouse or a commercial environment. The devices 106 may implement a telnet-based supply chain management application in the environment. In these and other embodiments, the management configuration may implement specific configurations (e.g., warehouse layout, user interface functionality, user authority, etc.) to the management application. Other similar management configurations may be applicable to devices groups in the managed network 111.

Data representative of an inventory of the devices 106, of information related to the device groups, of information related to the management configurations, as well as other data related to the managed network 111 may be stored at the management database 108A or 108B. For example, in the embodiment of FIG. 1, the first system 102A may be managing the managed network 111. Accordingly, the first management module 104A may have stored in the management database 108A an inventory of the devices 106 and device data related to the devices 106. Additionally, the management configurations and group structure data that is indicative of an arrangement and organization of the devices 106 may be stored in the management database 108A. To transition management to the second system 102B, the device data and the information related to device groups and associated management configurations are migrated to the management database 108B of the second system 102B. Moreover, in order for the second management module 104B to effectively manage the managed network 111, the device groups and the management configurations may be put in place in the second system 102B prior to the first system 102A ceasing management of the managed network 111.

In some embodiments, the managed network 111 and the manager systems 102 may implement a mobile device management (MDM) or an enterprise mobility management (EMM) system. In these and other embodiments, the management modules 104A and 104B may implement policies to automate, control and secure the devices 106 of the managed network 111. In some embodiments, the managed network 111 and the manager systems 102 may implement an endpoint management (EPM) system. The EPM system may be similar to the MDM or the EMM system, however, the EPM system may also include device discovery functionality, management of the products 122, etc. The migration module 118 may migrate MDM, EMM, and EPM systems as described elsewhere in the present disclosure.

The migration system 116 may include one or more hardware-based computing systems configured to communicate with the devices 106 and the manager systems 102 via the communication network 120. The migration system 116 may include a separate system (e.g., one or more computing devices) in some embodiments that interacts with the devices 106 and the manager systems 102. In some embodiments, the migration system 116 may be included in the first or second systems 102A or 102B. For instance, management of the managed network 111 may be transitioned from the first system 102A to the second system 102B. In this example, the migration system 116 may be included in the second system 102B to facilitate the migration.

The migration system 116 includes the migration module 118 that is configured to transfer management of the managed network 111 between the manager systems 102. For instance, the migration module 118 may be configured to transfer management from the first system 102A to the second system 102B. To implement the transfer, the migration module 118 may access information from the devices 106 and/or the management databases 108A and 108B. For instance, the migration module 118 may scrape device data and group structure data from the first system 102A. The group structure data is indicative of an arrangement and organization of the devices 106 in the network as defined by the first system 102A.

The migration module 118 may identify device groups of the managed network 111 based on the group structure data. The migration module 118 may build a network model that is representative of the arrangement of the managed network 111 based on the identified device groups. The network model replicates or substantially replicates the device groups of the managed network 111 as defined by the first system 102A.

The migration module 118 may populate the second system 102B or component thereof with the device groups of the network model such that the second system 102B includes two or more migrated device groups that correspond to the identified device groups of the first system 102A. The migration module 118 may generate an exportable data file based on the device data. The exportable data file may include a device group identifier for each of the devices 106.

The migration module 118 may communicate the exportable data file to the second system 102B. The communication of the exportable data file may enable or cause the second system 102B to organize the devices 106 into the migrated device groups of the second system 102B according to the device group identifiers.

The migration module 118 may cause a provisioning of the devices 106 into the second system 102B. The provisioning of the devices 106 may enable one or more or each of the devices 106 to establish communication or a communication channel with the second system 102B or the second management module 104B. Additionally, the provisioning of the devices enables the devices 106 to receive management configurations from the second system 102B or the second management module 104B consistent with the migrated device groups into which the device 106 is included.

The migration module 118 and components thereof may be implemented using hardware including a processor, a microprocessor (e.g., to perform or control performance of one or more operations), a field-programmable gate array (FPGA), or an application-specific integrated circuit (ASIC). In some other instances, the migration module 118 and components thereof may be implemented using a combination of hardware and software. Implementation in software may include rapid activation and deactivation of one or more transistors or transistor elements such as may be included in hardware of a computing system (e.g., the devices 106, the migration system 116, or the manager systems 102 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more manager systems 102, one or more devices 106, one or more migration systems 116, one or more managed networks 111, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together into a single component or server or separated into multiple components or servers.

Figure 2A:
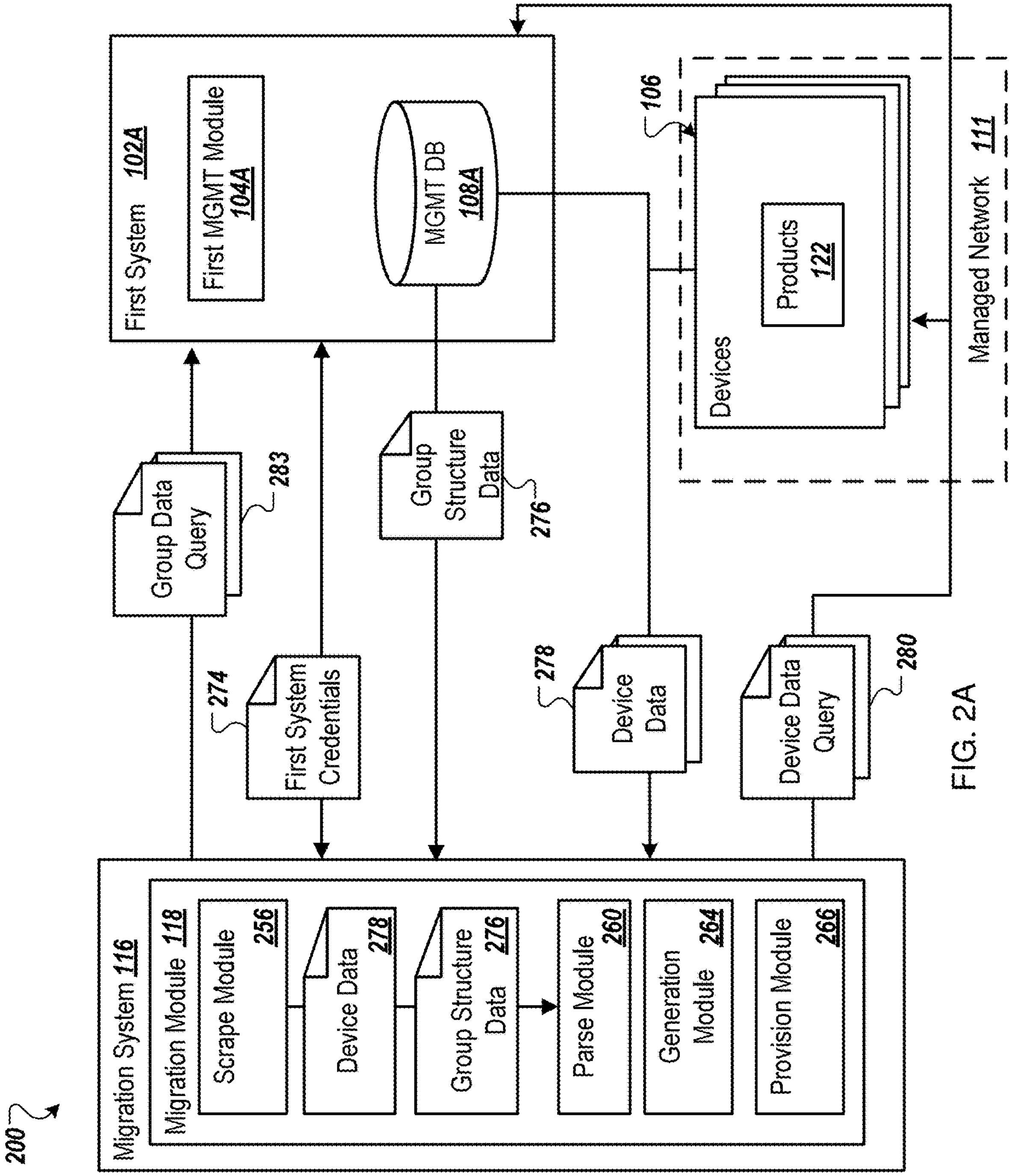
FIGS. 2A-2C depict block diagrams of an example migration process that may be implemented in the operating environment of FIG. 1.
Figure 2B:
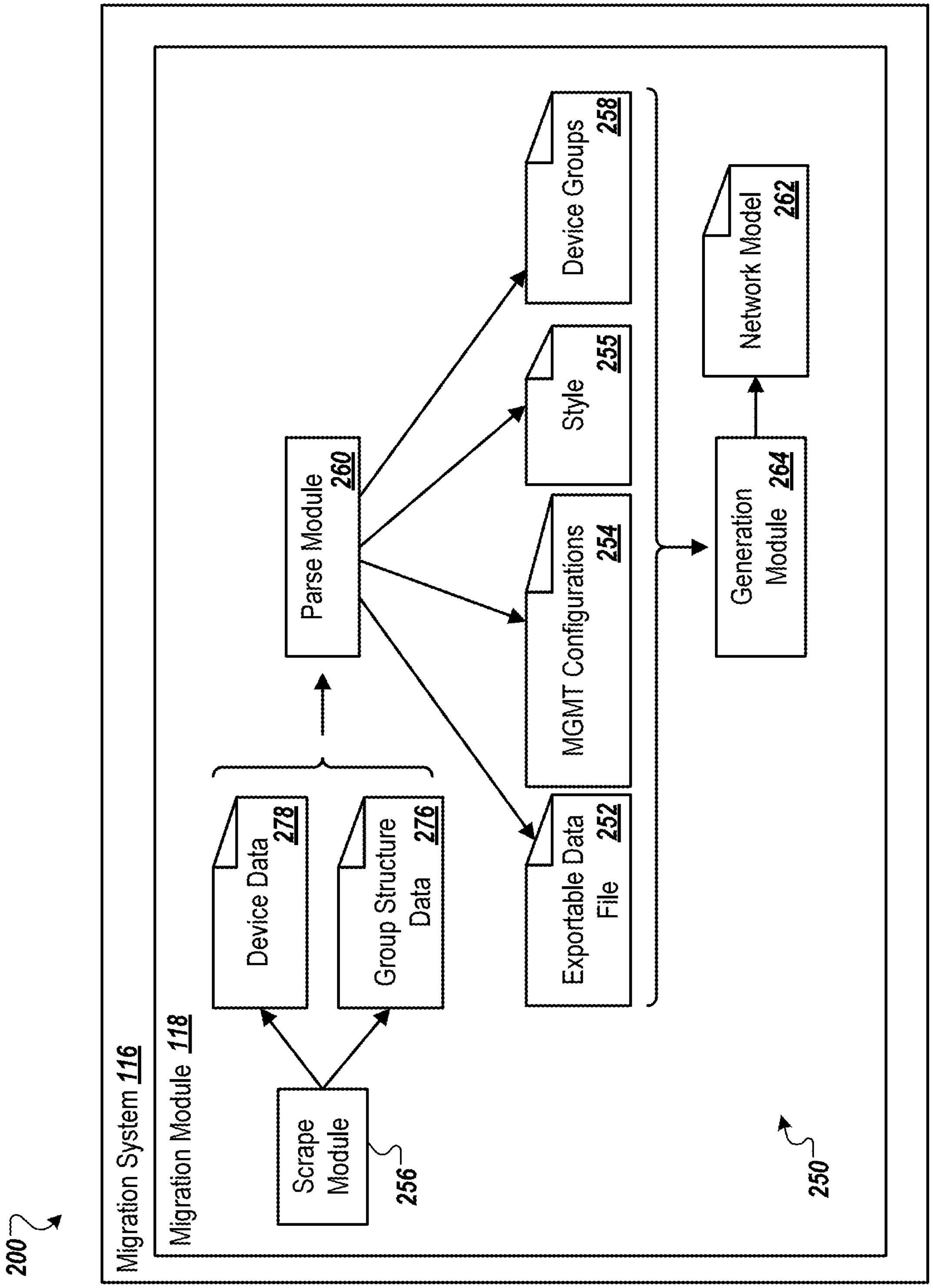
Figure 2C:
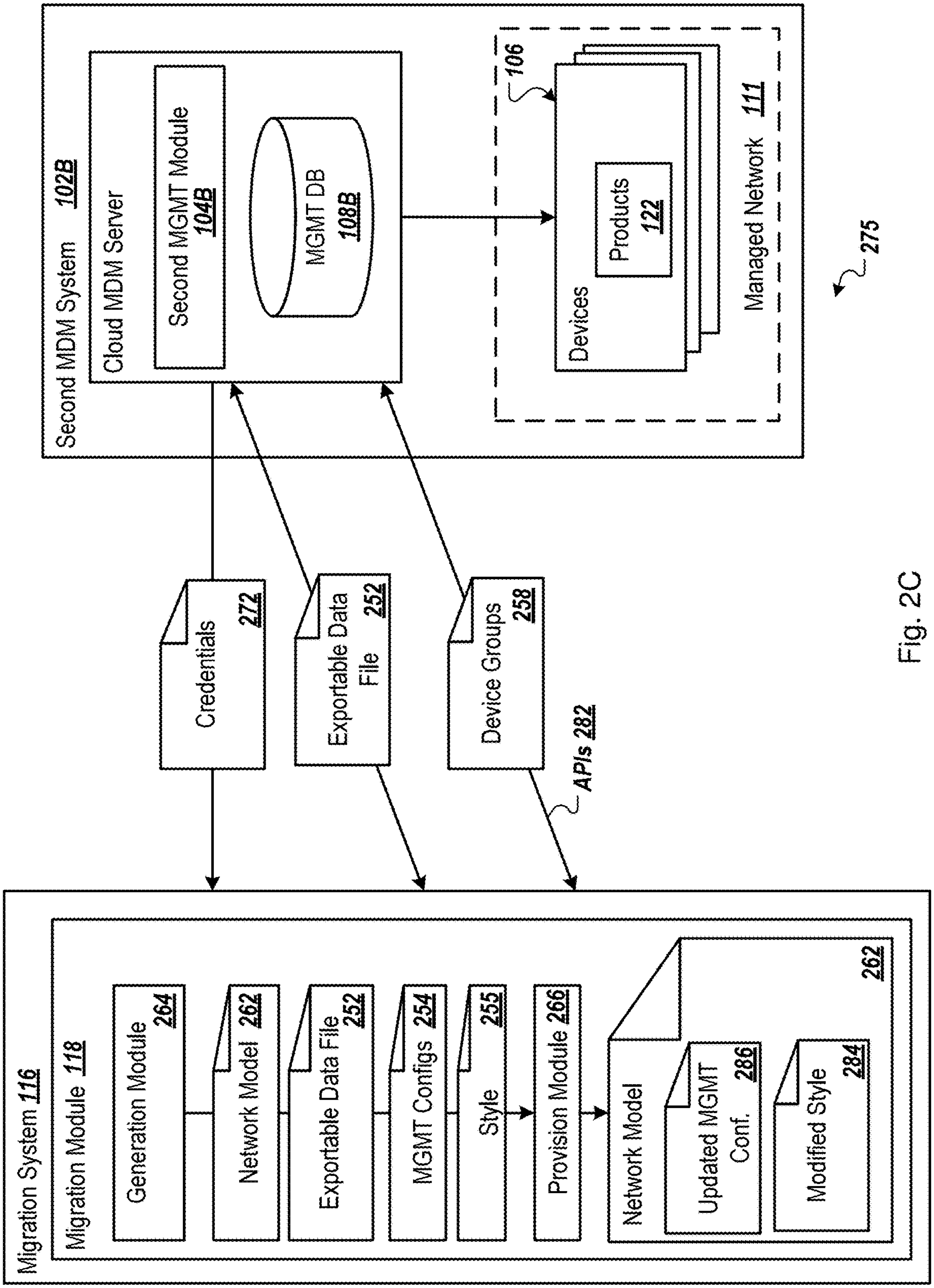

FIGS. 2A-2C depict block diagrams of an example migration process 200 that may be implemented in the operating environment 100 of FIG. 1 or another suitable operating environment. Some components (e.g., 116, 118, 102, 106, etc.) of the operating environment 100 are included in FIGS. 2A-2C. Additionally, although not depicted in FIGS. 2A-2C communication of data and information may be via a communication network such as the communication network 120 of FIG. 1. FIG. 2A depicts an example data acquisition process 201, FIG. 2B depicts an example parse process 250, and FIG. 2C depicts an example population process 275.

Referring to FIG. 2A, the data acquisition process 201 may include obtaining first system credentials 274 from the first system 102A. For instance, the first system 102A may communicate or otherwise provide the first system credentials 274 to the migration system 116. The first system credentials 274 may enable access to information stored at the first system 102A such as the device data 278 and group structure data 276. The first system credentials 274 may include an administrative credential in some embodiments that might provide a high level of privilege to unlock data and information stored by the first system 102A.

The migration module 118 may scrape data from the first system 102A and/or the devices 106. For example, the migration module 118 may include a scrape module 256. The scrape module 256 may communicate group data queries 283 to the first system 102A and device data queries 280 to the devices 106 and/or the first system 102A.

The group data queries 283 may be configured to access information related to the arrangement of the devices 106 in the managed network 111 as managed by the first system 102A. This information is referred to as group structure data 276. The group structure data 276 is indicative of the arrangement and organization of the devices 106 in the managed network 111. In some embodiments, the group structure data 276 may include a folder file structure in which subsets of the devices 106 and configurations applied thereto are stored in two or more sub-folders. Additionally or alternatively, subsets of the devices 106 may be tagged or associated with an identifier that indicates the subsets of the devices 106 are similarly managed. Additionally or alternatively, subsets of the devices 106 may be placed in categories by a device parameter such as location, device type, manufacture, role of user, etc. The group structure data 276 may be received by the scrape module 256 and communicated to the parse module 260.

The scrape module 256 may be further configured to access the device data 278 from the first system 102A and/or the devices 106. In some embodiments, the device data 278 may be scraped from the management database 108A. Additionally or alternatively, the device data 278 may be accessed via an agent or another one of the products 122 on the devices 106. The device data 278 may include data representative of a device name; a device serial number; a device manufacture; a device location; a device asset tag; a device product; a device record, another device parameter, or combinations thereof for one or more of the devices 106. The scrape module 256 may communicate the device data to the parse module 260.

FIG. 2B depicts an example of the parse process 250 that may be implemented in the migration process 200. FIG. 2B includes a portion of the migration module 118 that performs analytic operations to process and organize scraped data (e.g., 278 and 276). The parse process 250 is implemented to generate a network model 262. The network model 262 is a model that replicates or substantially replicates an arrangement of a managed network (e.g., the managed network 111). For instance, with reference to FIGS. 1 and 2B, management of the managed network 111 may be transitioned from the first system 102A to the second system 102B. The network model 262 replicates or substantially replicates the arrangement of the managed network 111 as it was managed by the first system 102A and written such that the second system 102B is able to process it.

For instance, the first system 102A may group the devices 106 based on location. The first system 102A may operate an on-premises management system that is locally implemented by local servers at each of multiple locations. The subset of the devices 106 at each of the locations may be similarly configured. The second system 102B may include a cloud-based or SaaS-based management system. Accordingly, the second system 102B may not implement local servers at the locations. The network model 262 may replicate the arrangement of the first system 102A. For instance, the subsets of devices 106 at each location may be organized into one of a set of groups and flagged with group identifiers. The network model 262 accordingly replicates the organization of the devices 106 of the first system 102A and conforms that organization to the second system 102B.

Referring to FIG. 2B, to generate the network model 262, the device data 278 and the group structure data 276 may be parsed according to the parse process 250. The parse process 250 may be implemented by the parse module 260. In general, the parse module 260 may be configured to identify the organization and arrangement of a managed network such as the managed network 111 of FIG. 1. The arrangement of the managed network is based on devices, device data associated with the devices, device groups, and management of subsets of devices in the device groups 258.

For instance, the parse module 260 may be configured to receive the device data 278 and the group structure data 276 from the scrape module 256. The parse module 260 may separate and organize the device data 278 and the group structure data 276 to identify device groups 258, a style 255 in which the device groups 258 are formed, and management configurations 254 associated with each of the device groups 258. Accordingly, the parse module 260 is implemented to identify the device groups 258, determine the style 255 of device group formation, and the management configurations 254 that are associated with the device groups 258.

For example, within the device data 278 and the group structure data 276, there may be data or information that indicates a subset of devices are similarly managed and should be grouped or clustered. For instance, information related to a subset of the devices and associated management configurations 254 may be stored in a single sub-folder of a folder-structure. Accordingly, the subset of the devices may be clustered into a device group. Similarly, a subset of the devices may have a particular product (e.g., 122) or application that is not installed on other devices. Accordingly, these devices may be included in a device group. Other factors or parameters may be used to identify device groups. For instance, a common management configuration, association with users having a particular role, a common security setting, a common configuration of one of the products, a common device type, a common device manufacture, other parameters, or combinations thereof.

Additionally, the parse module 260 may identify the style 255 according to which the device groups 258 are formed and one or more management configurations 254 applied to each of the identified groups. Accordingly, the parse module 260 may identify the device groups 258 and subsets of devices included in each of the device groups 258. Additionally, the parse module 260 may associate each of the device groups 258 with the management configurations 254 applied to the subset of devices and/or the style 255 of group formation applied by a managing system from which the management is being transferred.

In addition, the parse module 260 may be configured to generate an exportable data file 252. The exportable data file 252 may include data representative of the device data 278 and any indication of the device groups 258. The exportable data file 252 may be organized by device. For instance, the device may be identified, followed by one or more parameters that describe the device. The exportable data file 252 may be formatted such that it may be received and integrated into a manager system to which the management is being transferred. For instance, the exportable data file 252 may be formatted as a comma-separated value (CSV) file, a database file, a spreadsheet file (e.g., XLS or XLSX), etc.

The device groups 258, the style 255, the management configurations 254, the exportable data file 252, or some combination thereof may be communicated to the generation module 264. The generation module 264 may create or generate the network model 262 based thereon. The network model 262 may accordingly include an inventory of the devices and associated device data, the device groups 258 and subsets of the devices included in the device groups 258, one or more of the management configurations 254 applied to each of the device groups 258, and the style by which the device groups 258 were created in the managing system from which the management of the managed network is being transferred.

FIG. 2C depicts an example of the population process 275 that may be implemented as part of the migration process 200 or another suitable process. FIG. 2C depicts a portion of the migration system 116, the second system 102B, and the managed network 111. The population process 275 is described with combined reference to FIGS. 2A-2C and discusses components depicted in FIGS. 2A and 2B.

The population process 275 is configured to communicate the arrangement and organization of the first system 102A and the managed network 111 to the second system 102B. In some embodiments, the population process 275 occurs prior to the first system 102A ceasing management of the managed network 111 and prior to the management of the managed network 111 being transferred to the second system 102B. The population process 275 may reduce or eliminate a time that the devices 106 are not actively managed.

The population process 275 may be performed after the parse process 250 of FIG. 2B. For instance, the population process 275 may occur after generation of the network model 262 in the parse process 250. The population process 275 of FIG. 2C may begin by a provision module 266 receiving output from the generation module 264 and/or the parse module 260 such as the network model 262, the exportable data file 252, the management configurations 254, the style 255, or some combination thereof.

In some embodiments, the provision module 266 may be configured to modify the network model 262 to generate a modified network model 277 or some portion thereof output by the generation module 264. For instance, the provision module 266 may be configured to modify at least one aspect of the style 255 identified by the parse module 260. For example, the device groups 258 may be organized based on a first style that is utilized by the first system 102A. The provision module 266 may modify the first style such that the modified network model 277 includes a modified style 284 in which device groups 258 of the second system 102B are organized. For instance, in the first system 102A, the device groups 258 may be organized based on a folder structure and/or locations of the devices 106. In the second system 102B, the device groups 258 may be organized using tags or group identifiers, which may be associated with the devices 106 of each of the device groups 258. The tags may replicate or at least substantially replicate the folder structure and/or locations.

Additionally, in some embodiments, the provision module 266 may build updated management configurations 286. The updated management configurations 286 may be similar or identical to the management configurations 254 identified by the parse module 260, but may be modified such that the second system 102B is able to execute them. For instance, the first system 102A may generate device groups 258 based on location. The device groups 258 in this example may include a management configuration 254 that communicates data and information with a local server at one of the locations via a LAN. The second system 102B may be a SaaS-based management system, which may not implement the local server. Accordingly, a corresponding, updated management configuration 286 may modify the communication configurations to communicate the data and information with a remote server or an edge device via a WLAN such as the internet. Again, the updated management configurations 286 may replicate or substantially replicate the management configurations 254, but may be modified to enable execution in the second system 102B.

In some embodiments of the population process 275, the provision module 266 may receive credentials 272 from the second system 102B. The credentials 272 of the second system 102B may be used in the population process 275. For instance, the credentials 272 enable access to the second management module 104B and/or the management database 108B. Such access may enable the visibility and "write" access to the second management module 104B.

The provision module 266 may populate the second system 102B. For instance, the provision module 266 may populate the second system 102B with data representative of the device groups 258 of the network model 262 or the modified network model 277. In some embodiments, population of the second system 102B may create migrated device groups in the second system 102B that correspond to the identified device groups 258 of the first system 102A. For instance, for each of the identified device groups 258 of the first system 102A, a corresponding migrated device group may be created on the second system 102B.

In some embodiments, the provision module 266 may populate the second system 102B using one or more application programming interfaces (APIs) 282. For instance, the second system 102B may implement one or more APIs 282 that are run against the network model 262 or the modified network model 277. In these and other embodiments, the credentials 272 may include API credentials that enable use of the APIs 282.

The APIs 282 may pull data such as data representative of the device groups 258 from the network model 262 or the modified network model 277. As the second system 102B is populated, the arrangement of the managed network 111 may be reproduced or substantially reproduced into the migrated device groups at the second system 102B. Additionally, the APIs 282 may pull data representative of the updated management configurations 286 associated with the device groups 258 and/or the modified style 284. As the APIs 282 pull the data representative of the updated management configurations 286, the migrated device groups may be associated with the updated management configurations 286. Accordingly, the first system 102A may include a first device group having a first subset of the devices 106. A first management configuration may be implemented to manage or control the first subset of the devices 106. Populating the second system 102B may result in creation of a first migrated device group that corresponds to the first device group. The first subset of the devices 106 may be included in the first migrated device group. Additionally, a first updated management configuration may be generated that corresponds to the updated management configuration. The first updated management configuration may be implemented in the second system 102B relative to the first subset of the devices 106.

The provision module 266 may communicate the exportable data file 252 to the second system 102B. As stated above, the exportable data file 252 may be formatted such that the data is digestible by the second system 102B. In some embodiments, the exportable data file 252 may be communicated to fill in the network model 262 or the modified network model 277 generated in the second system 102B. The data included in the exportable data file 252 may enable organization of the devices 106 into the migrated device groups of the second system 102B. For instance, in some embodiments the exportable data file 252 may include device group identifiers. In these and other embodiments, the devices 106 may be organized into the migrated device groups according to the device group identifiers.

The provision module 266 may cause a provisioning of the devices 106 into the second system 102B. The provision module 266 may cause the provisioning such that each of the devices 106 establishes communication with the second system 102B or a component thereof and receives the management configurations 286 or 254 from the second system 102B consistent with the migrated device groups into which the devices 106 are included. In some embodiments, causing the provisioning of the devices 106 occurs after the devices 106 are organized into the migrated device groups. Additionally, in these and other embodiments, the second system 102B is populated and the exportable data file 252 is communicated before management of the managed network 111 by the first system 102A ceases. Accordingly, the provisioning of the devices 106 occurs with substantially no interruption of management of the managed network 111. For instance, in some embodiments, the provisioning includes a reboot operation initiated by the devices 106. Accordingly, the devices 106 are managed by the first system 102A until the provisioning is caused by the provision module 266. After the provisioning is caused, the devices 106 may reboot, which transfers management to the second system 102B.

Figure 3:
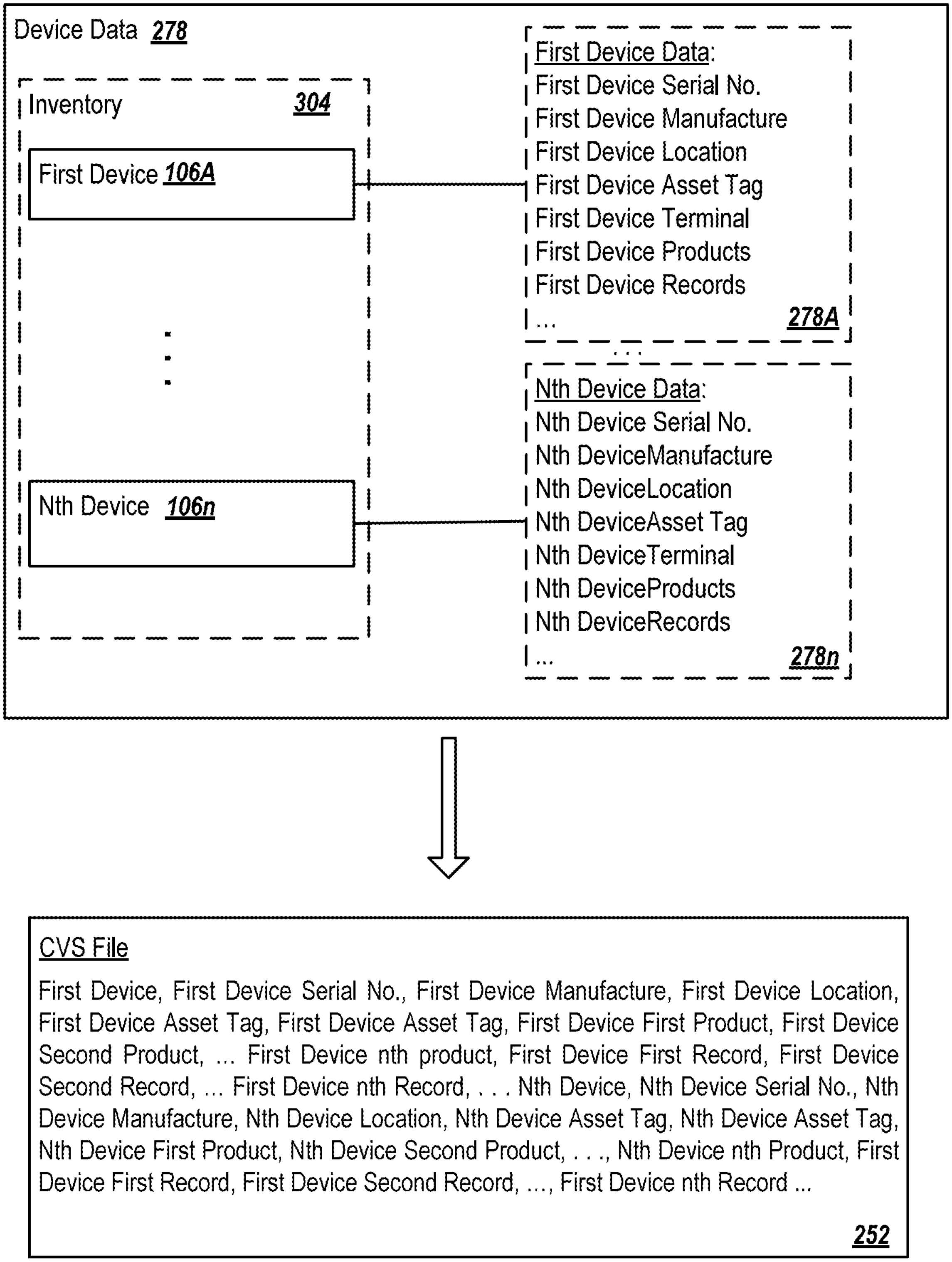
FIG. 3 depicts a block diagram of an example of the device data and an example of the exportable data file that may be implemented in the migration process of FIGS. 2A-2C.

FIG. 3 depicts a block diagram of an example of the device data 278 and an example of the exportable data file 252 that is based on the device data 278 that may be implemented in the migration process 200 of FIGS. 2A-2C. As described elsewhere in the present disclosure, the device data 278 may be scraped from a first system (e.g., 102A) from which management of a managed network is transitioned. The device data 278 may include an inventory 304 of the devices 106 from a managed network (e.g., the managed network 111). For example, the inventory 304 may include a list of the devices 106 included in the managed network.

In the device data 278, each of the devices 106 of the inventory 304 may be associated with device-specific device data 278A and 278*n*. For instance, in the depicted embodiment, the first device 106A may have associated therewith a first device serial no., a first device manufacture, a first device location, a first device asset tag, a first device terminal, first device products (e.g., the products 122), and first device records. Similarly, an nth device 106*n* may have associated therewith an nth device serial no., an nth device manufacture, an nth device location, an nth device asset tag, an nth device terminal, nth device products (e.g., the products 122), and nth device records.

The exportable data file 252 includes the device data 278 in a form that is digestible by one of the managing systems such as the second system 102B of FIGS. 1-2C. For instance, in the depicted embodiment, the data file 302 is a comma-separated value (CSV) file. In the CVS file, each of the device-specific device data 278 is listed, separated by a comma. The second system to which the exportable data file 252 is communicated may receive the exportable data file 252, and then integrate and organize the device data 278. For instance, the device data 278 may be extracted from the exportable data file and organized into a database. Specifically, the device data 278 may be integrated into a framework resulting from data populated in the second system by the migration system.

Figure 4:
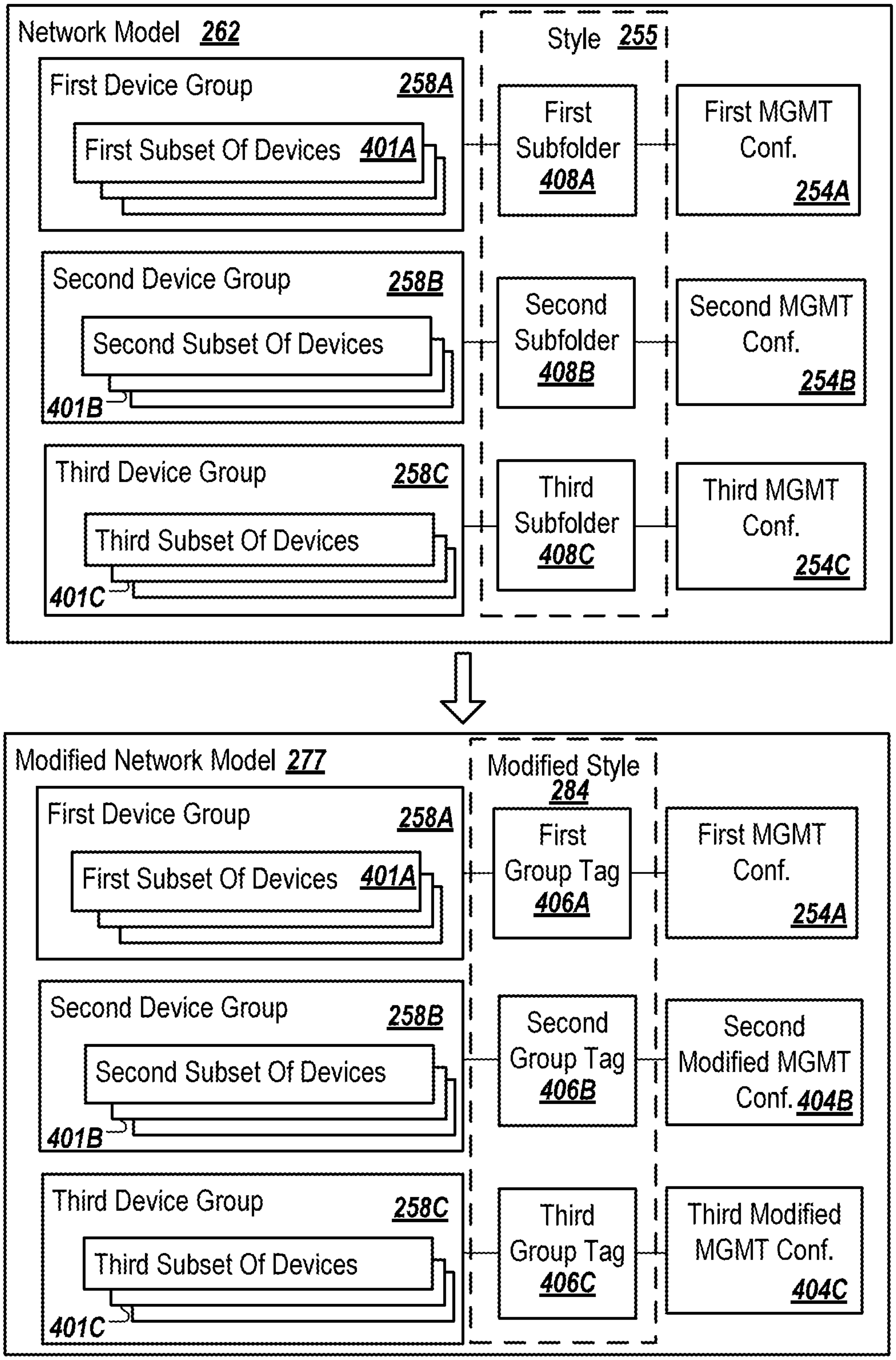
FIG. 4 depicts a block diagram of an example of the network model and a modified network model that may be implemented in the migration process of FIGS. 2A-2C.

FIG. 4 depicts a block diagram of an example of the network model 262 and of the modified network model 277 that may be implemented in the migration process 200 of FIGS. 2A-2C or another suitable process. The network model 262 includes three device groups 258A-258C (generally, device group 258 or device groups 258). The device groups 258 include subsets of devices 401A-401C (subset or devices 401 or subsets of devices 401). Additionally, the device groups 258 are associated with the style 255. For instance, the first device group 258A may have been organized into a first subfolder 408A in the first system (e.g., the first system 102A). Similarly, a second device group 258B may have been organized into a second subfolder 408B and a third device group 258C may have been organized into a third subfolder 408C. Additionally still, the device groups 258 may be associated with management configurations 254A-254C. For instance, the first device group 258A may be associated with a first management configuration 254A. As described elsewhere in the present disclosure, during management of a managed network including the device groups 258, the first management configuration 254A may be implemented on the first subset of devices 401A.

In the modified network model 277, one or more changes to the network model 262 may be implemented. For instance, the modified network model 277 may be a result of a provision module 266 evaluating whether a second system is able to implement management configuration 254 and/or whether the style 255 according to which the device groups 258 are organized is applicable at the second system. In response to a determination that the management configurations 254 cannot be implemented at the second system, a modified management configuration 404B or 404C may be generated and associated with a corresponding device group 402. Similarly, in response to a determination that the style 255 according to which the device groups 258 are organized is unsuitable or inapplicable to the second system, a modified style 284 may be generated and implemented in the modified network model 277.

For instance, in FIG. 4, the second and the third management configurations 254B and 254C may not be implemented at the second system. Accordingly, a second modified management configuration 404B and a third modified management configuration 404C may be created. The second modified management configuration 404B may be associated with the second device group 258B and the third modified management configuration 404C may be associated with the third device group 258C. The second and third modified management configurations 404B and 404C may be transferred to the second system during a data population operation and provisioned to the devices 106 during a provisioning operation. The first management configuration 254A may be executable in the second system. Accordingly, the first management configuration 254A may be included in the modified network model 277.

Additionally, in response to a determination that the style 255 is inapplicable or unsuitable for the second system, the modified style 284 may be created. The modified style 284 may be an alternative organizational parameter that determines and/or identifies the device groups 258. For instance, in the network model 262, the style 255 may be subfolders. In the second system, subfolders may not be implemented. Accordingly, the modified style 284 of group tags 406A-406C may be implemented.

Figure 5:
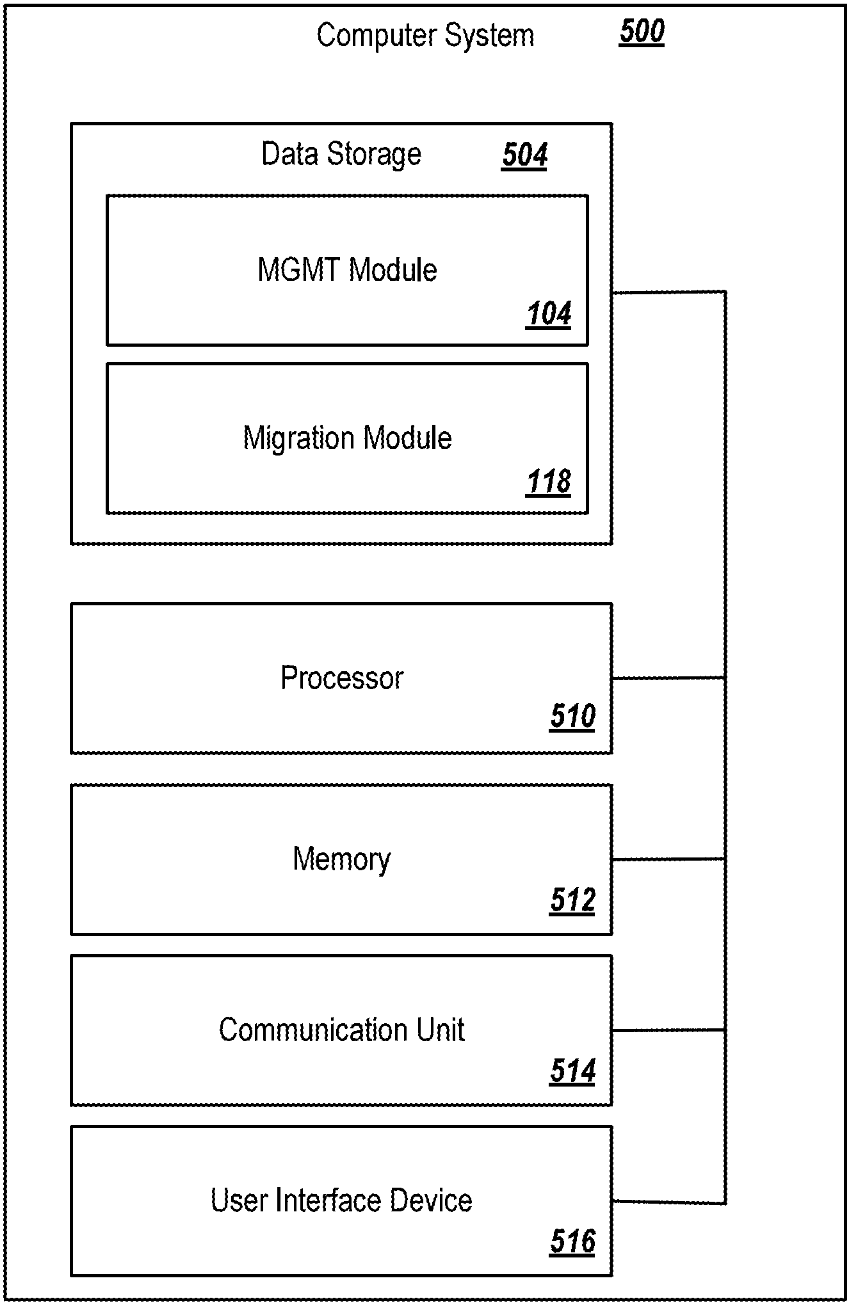
FIG. 5 illustrates an example computing system configured for device management system migration.

FIG. 5 illustrates an example computing system 500 configured for device management system migration according to at least one embodiment of the present disclosure. The computing system 500 may be implemented in the operating environment 100 of FIG. 1 or another suitable operating environment. Examples of the computing system 500 may include the migration system 116, the manager systems 102, the devices 106, or some combination thereof. The computing system 500 may include one or more processors 510, a memory 512, a communication unit 514, a user interface device 516, and a data storage 504 that includes the management module 104 and the migration module 118 (collectively, modules 104/118).

The processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 5, the processor 510 may more generally include any number of processors configured to perform individually or collectively any number of operations described in the present disclosure. Additionally, one or more of the processors 510 may be present on one or more different electronic devices or computing systems. In some embodiments, the processor 510 may interpret and/or execute program instructions and/or process data stored in the memory 512, the data storage 504, or the memory 512 and the data storage 504. In some embodiments, the processor 510 may fetch program instructions from the data storage 504 and load the program instructions in the memory 512. After the program instructions are loaded into the memory 512, the processor 510 may execute the program instructions.

The memory 512 and the data storage 504 may include computer-readable storage media for carrying or having computer-executable instructions or data structures stored thereon. Such computer-readable storage media may include any available media that may be accessed by a general-purpose or special-purpose computer, such as the processor 510. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 514 may include one or more pieces of hardware configured to receive and send communications. In some embodiments, the communication unit 514 may include one or more of an antenna, a wired port, and modulation/demodulation hardware, among other communication hardware devices. In particular, the communication unit 514 may be configured to receive a communication from outside the computing system 500 and to present the communication to the processor 510 or to send a communication from the processor 510 to another device or network (e.g., the communication network 120 of FIG. 1).

The user interface device 516 may include one or more pieces of hardware configured to receive input from and/or provide output to a user. In some embodiments, the user interface device 516 may include one or more of a speaker, a microphone, a display, a keyboard, a touch screen, or a holographic projection, among other hardware devices.

The modules 104/118 may include program instructions stored in the data storage 504. The processor 510 may be configured to load the modules 104/118 into the memory 512 and execute the modules 104/118. Alternatively, the processor 510 may execute the modules 104/118 line-by-line from the data storage 504 without loading them into the memory 512. When executing the modules 104/118, the processor 510 may be configured to perform one or more processes or operations described elsewhere in this disclosure.

Modifications, additions, or omissions may be made to the computing system 500 without departing from the scope of the present disclosure. For example, in some embodiments, the computing system 500 may not include the user interface device 516. In some embodiments, the different components of the computing system 500 may be physically separate and may be communicatively coupled via any suitable mechanism. For example, the data storage 504 may be part of a storage device that is separate from a device, which includes the processor 510, the memory 512, and the communication unit 514, that is communicatively coupled to the storage device. The embodiments described herein may include the use of a special-purpose or general-purpose computer including various computer hardware or software modules, as discussed in greater detail below.

Figure 6:
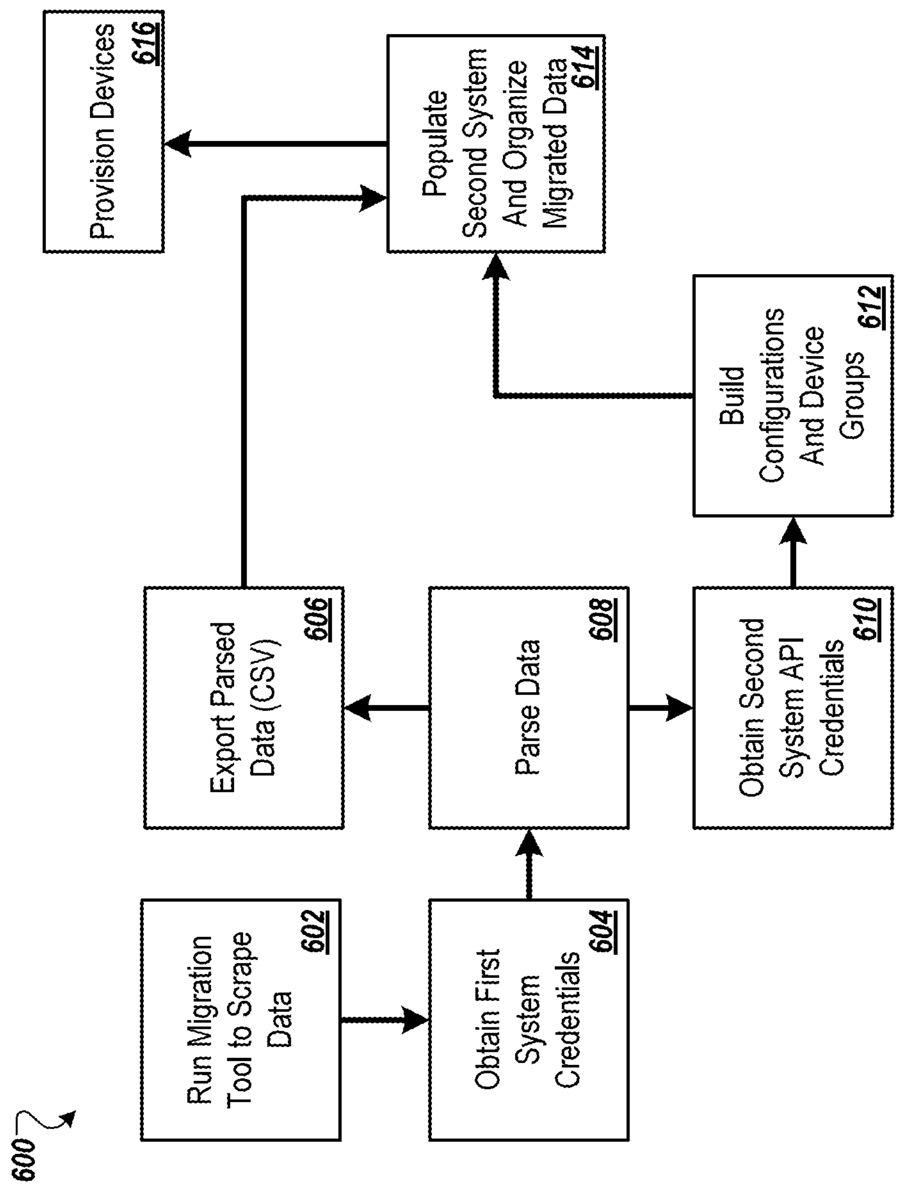
FIG. 6 is a flow chart of a method of device management system migration.

FIG. 6 is a flow chart of an example method 600 of device management system migration that may be implemented in the operating environment 100 of FIG. 1 or another suitable environment. The method 600 may be performed at least partially by the migration module 118 of FIG. 1. The method 600 may begin at block 602 in which a migration tool may be run to scrape data. For instance, the migration module 118 may communicate one or more queries to the first system 102A and/or the devices 106. At block 604, credentials of the first system may be obtained. For instance, the migration module 118 may communicate a query to the first system 102A or an administrator thereof to obtain credentials. The credentials may be obtained to provide privilege and authorization to review and analyze the scraped data.

At block 608, the data may be parsed. The credentials of the first system may be used when the data is parsed. Parsing the data may include identifying device groups in the scraped data and/or generating an exportable file that organizes the scraped data. For instance, the exportable file may include an inventory of devices along with device data that describes the device. Additionally, the exportable file may include device group identifiers or tags that associate the devices with device groups. In some embodiments, parsing the data may include identifying a style in which the devices are grouped and group-specific management configurations that may be applied to identified device groups.

At block 610, a second system API credentials may be obtained. For instance, the migration module 118 may obtain API credentials for the second system. The API credentials may enable communication of data and information from the migration system 116 to the second system 102B. At block 612, management configurations and device groups may be built. The management configurations may include group-specific management configurations that are implemented in one or more device groups when the managed network is managed by the second system.

At block 614, the second system may be populated. During the population operation data and information may be communicated to the second system such as information that defines the device groups, management configurations associated with the device groups, style information, or combinations thereof may be communicated to the second system. The population operation may define a framework or model from which management of the managed network may be implemented.

At block 606, the exportable file may be exported. The exportable file may be exported to the second system after the second system is populated. The exportable file may be used by the second system to organize device data.

At block 616, the devices may be provisioned or caused to be provisioned. Provisioning the devices transitions the devices from management by the first system to management by the second system. The provisioning may include an update communication to a local client or local application running on the devices. Additionally or alternatively, the provisioning may include establishing a communication channel with the second system by the devices such that management configurations and attributes may be communicated from the second device to the devices. For instance, the devices 106 of the managed network 111 may be provisioned or provisioning of the devices 106 may be caused. In some embodiments, provisioning the devices 106 may include the devices 106 performing a reboot operation. As the devices 106 reboot, the devices 106 may execute instructions to communicate with the second system 102B and load management configurations communicated from or made accessible by the second system 102B.

Figure 7A:
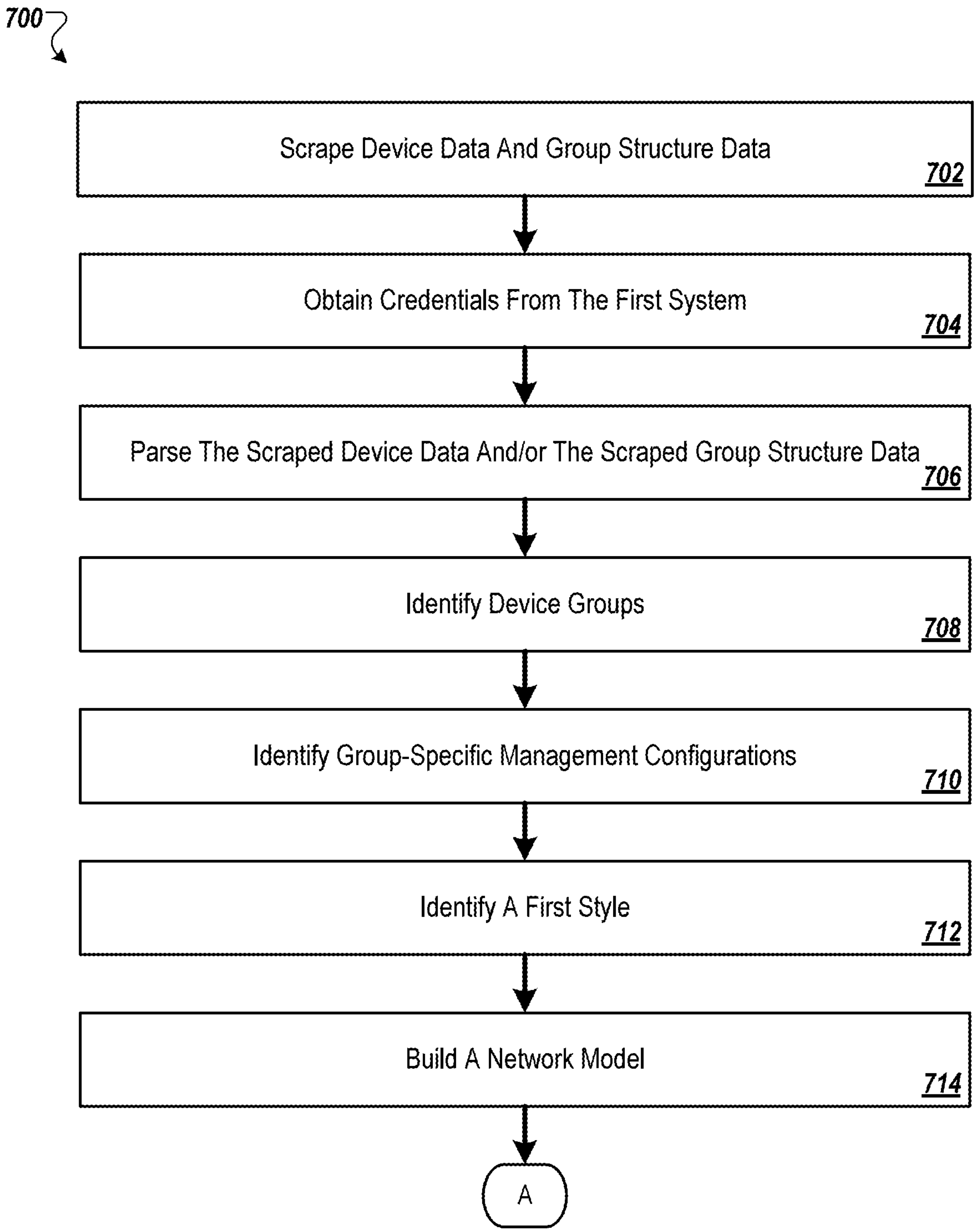
FIGS. 7A-7B are a flow chart of another example method of device management system migration, all according to at least one embodiment described in the present disclosure.
Figure 7B:
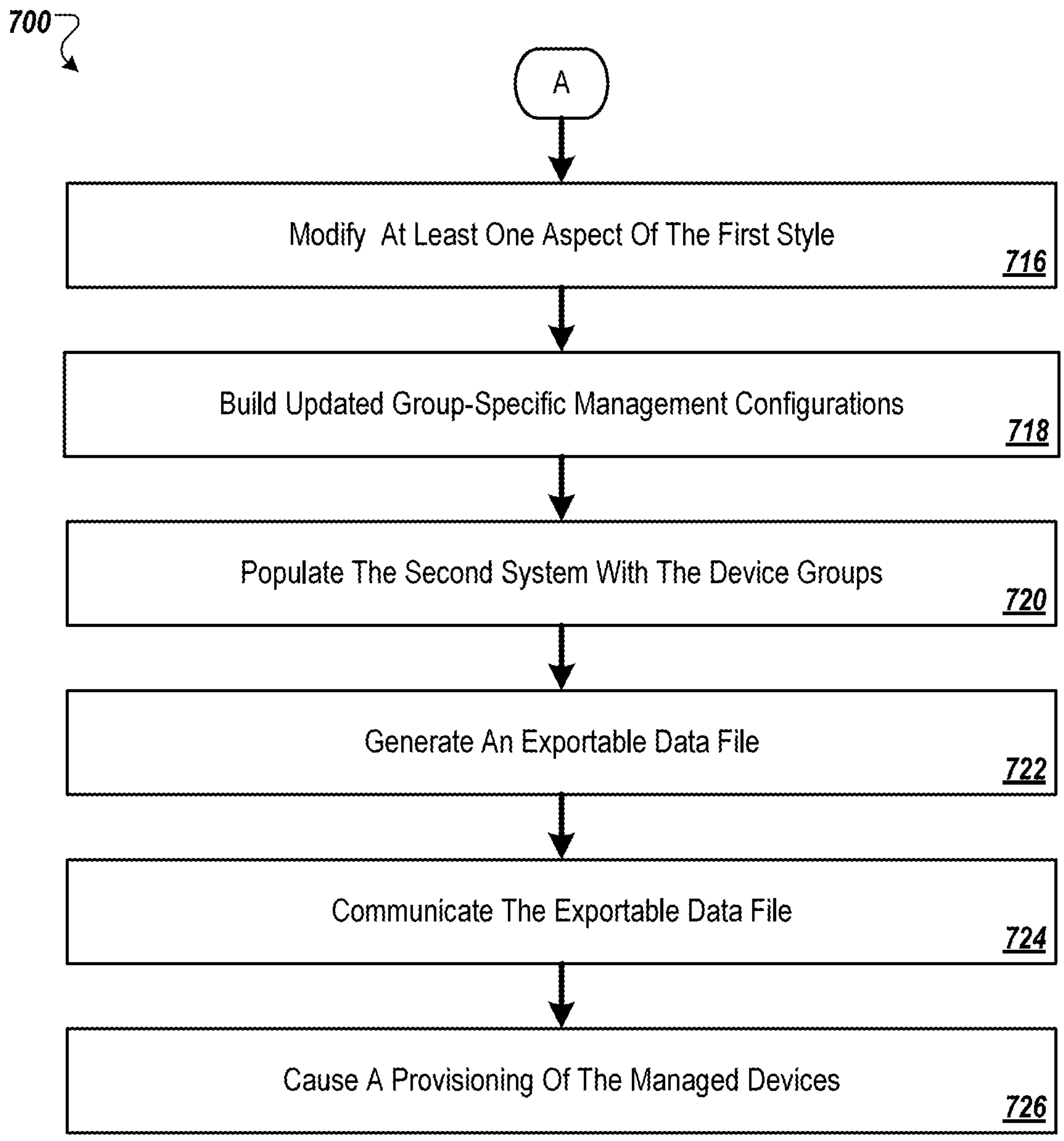

FIGS. 7A and 7B are a flowchart of an example method 700 of device management system migration according to at least one embodiment of the present disclosure. The method 700 describes an example system migration from a first system to a second system. For instance, the first system is implemented to at least partially manage a network of managed devices. Management of the network is being transitioned from the first system to a second system. The method 700 may be implemented to migrate the management of the network from the first system to the second system. The method 700 may begin at block 702 in which device data and group structure data may be scraped. The device data and group structure data may be scraped from the first system. In some embodiments, the device data and the group structure data may be scraped by remotely implementing a migration tool from a cloud server. The cloud server may communicate with a database of the first system to access the device data and the group structure data.

For instance, the first system may include a first mobile device management (MDM) system, the network may include a supply chain management network that may include multiple rugged devices with scanners, point of sale (POS) devices, printers, and servers implemented to capture and communicate information obtain through use of the rugged devices. The second system may include a second MDM system. For instance, the second MDM system may include a second supply chain management system.

Additionally, in some embodiments, the first system may include an on-premises system, which may be deployed at two or more locations. The second system may include a SaaS-based MDM system. Accordingly, in these embodiments, the migration may be from the on-premises system to a SaaS-based management system.

The group structure data that is scraped from the first system is indicative of an arrangement and organization of the managed devices in the network. For instance, in embodiments in which the first system includes an on-premises system deployed at two or more locations, the group structure data may include a folder structure. The folder structure may include a first folder related to a first location of the two or more locations and a second folder related to a second location of the two or more locations. In embodiments in which the migration is between two SaaS systems, the group structure data may include a folder system or a tag-based system in which the management devices include a group-identifier. In embodiments in which the group structure data includes file structure data, device groups may be organized into one or more subfolders of the file structure. In some embodiments, the device data may include: a device name, a device serial number, a device manufacture, a device location, a device asset tag, a device product, a device record, other device data, or combinations thereof for the managed devices.

At block 704, credentials from the first system may be obtained. The credentials may enable manipulation of the device data and the group structure data. At block 706, one or both of the scraped device data and the scraped group structure data may be parsed. The scraped device data and the scraped group structure data may be parsed to generate the exportable data file and to identify the device groups (of block 708). The credentials may be used in the parsing operation.

At block 708, device groups may be identified. The device groups of the network may be identified based on the group structure data. The identified device groups may include one or more device groups that include a subset of the managed devices. For instance, the identified device groups may include a first device group that includes a first subset of the managed devices and a second device group that includes a second subset of managed devices.

At block 710, group-specific management configurations may be identified. For instance, group-specific management configurations may be identified for each of the identified device groups. In some embodiments, the group-specific management configurations may include a setting, set of information, application version, or functionality that is implemented in the subset of devices in the device groups. For instance, a first device group that includes a first subset of the managed devices may include a first group-specific management configuration that is applied to the first subset and a second device group that includes at a second subset of managed devices may include a second group-specific management configuration that is applied to the second subset. The identified device groups may be associated with the group-specific management configurations. For instance, the device groups may be tagged with the group-specific management configurations.

At block 712, a first style may be identified. The first style may indicate the way in which the device groups are organized in the first system. The first style may be a criterium or parameter that forms the basis of the device groups. For instance, in a managed network the device groups may be based on a location. In another managed network, the device groups may be based on device type, role of the user, etc.

At block 714, a network model may be built. The network model may be representative of the arrangement of the network. The network model may be built based on the identified device groups. The network model may replicate or substantially replicate the device groups of the network. In some embodiments, the network model includes associations between the group-specific management configurations and the identified device groups. In some embodiments, the building the network model may include generation of a tree structure based on the group structure data. The managed devices may then be assigned to one or more portions of the tree structure.

Referring to FIG. 7B, at block 716, at least one aspect of the first style may be modified. For instance, an aspect of the first style may be modified in the network model. The first style may be modified such that the network model includes a second style in which migrated device groups are organized in the second system. For instance, in some embodiments the first style includes a folder-structure based organization, which may be modified to a second style such as a tag-based organization.

At block 718, updated group-specific management configurations may be built. The updated group-specific management configurations may be built for the second system based on the group-specific management configurations. For instance, in some embodiments, the group-specific management configurations or some portion thereof may not be supported in the second system. Accordingly, the group-specific management configurations may be updated to conform to the second system.

At block 720, the second system may be populated with the device groups of the network model. The second system may be populated such that the second system includes two or more migrated device groups that correspond to the identified device groups of the first system. The migrated device groups may correspond one-to-one with the identified device groups of the network. For instance, the identified device groups may include a first device group having a first subset of devices and a second device group having a second subset of devices. The migrated device groups may include a first migrated device group that includes the first subset and a second migrated device group that includes the second subset of managed devices. In some embodiments, populating the second system includes running an application programming interface (API) against the network model.

At block 722, an exportable data file may be generated. The exportable data file may be generated based on the device data. In some embodiments, the exportable data file includes a device group identifier for the managed devices. The exportable data file may include a CSV file or another suitable data file.

At block 724, the exportable data file may be communicated to the second system. The exportable data file may be communicated such that the second system organizes the managed devices into the migrated device groups of the second system according to the device group identifiers. In some embodiments, the second system is populated, and the exportable data file is communicated before management of the network by the first system ceases such that the provisioning (e.g., of block 726) of the managed devices occurs with substantially no interruption of management of the network.

At block 726, a provisioning of the managed devices may be caused. The provisioning may transition the managed devices into management by the second system. The provisioning may be caused such that the managed devices establish communication with the second system and receive management configurations from the second system consistent with the migrated device groups into which the managed device is included. In some embodiments, the provisioning may include a reboot operation initiated by the managed devices. In some embodiments, the causing the provisioning of the managed devices occurs after the managed devices are organized into the migrated device groups. Accordingly, the second system is set up in advance and the provisioning occurs afterwards such that there is minimal if any interruption in management of the managed devices. After the provisioning the managed devices into the second system, the first subset is configured according to the first group-specific management configuration and the second subset of managed devices is configured according to the second group-specific management configuration.

Further, modifications, additions, or omissions may be made to the methods without departing from the scope of the present disclosure. For example, the operations of methods may be implemented in differing orders. Furthermore, the outlined operations and actions are only provided as examples, and some of the operations and actions may be optional, combined into fewer operations and actions, or expanded into additional operations and actions without detracting from the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the systems and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modules running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of device management system migration, the method comprising automatically and without user intervention:

scraping, by a migration module, device data and group structure data from a first system by sending a plurality of queries to the first system and gathering the device data and the group structure data based on responses to the plurality of queries, wherein:

the first system is implemented to at least partially manage a network of managed devices, management of the network is being transitioned from the first system to a second system, and the group structure data is indicative of an arrangement and organization of the managed devices in the network;

identifying, by the migration module, device groups of the network based on the group structure data;

building a network model that is representative of the arrangement of the network based on the identified device groups, wherein the network model replicates or substantially replicates the device groups of the network;

populating, by the migration module, the second system with the device groups of the network model such that the second system includes two or more migrated device groups that correspond to the identified device groups of the first system;

generating, by the migration module, an exportable data file based on the device data, wherein the exportable data file includes a device group identifier for each of the managed devices;

communicating, by the migration module, the exportable data file to the second system to cause the second system to organize the managed devices into the migrated device groups of the second system based on the device group identifiers of the exportable data file; and after the managed devices are organized by the second system into the migrated device groups, causing, by the migration module, a provisioning of the managed devices from management by the first system to management by the second system, wherein the causing the provisioning includes:

sending an update communication to a local client running on the managed devices;

establishing a communication channel with the second system by the managed devices to cause management configurations and attributes to be communicated from the second system to the managed devices; and initiating, by the managed devices, a reboot operation, wherein:

each of the managed devices establishes the communication channel with the second system and receives management configurations from the second system consistent with the migrated device groups into which the managed device is included, and the second system is populated and the exportable data file is communicated before management of the network by the first system ceases such that the provisioning of the managed devices occurs with substantially no interruption of management of the network.

2. The method of claim 1, wherein:

the identified device groups include a first device group that includes a first subset of the managed devices and a first group-specific management configuration that is applied to the first subset and a second device group that includes a second subset of managed devices and a second group-specific management configuration that is applied to the second subset;

the migrated device groups include a first migrated device group that includes the first subset and a second migrated device group that includes the second subset of managed devices; and after the provisioning of the managed devices, the first subset is configured according to the first group-specific management configuration and the second subset of managed devices is configured according to the second group-specific management configuration.

3. The method of claim 1, further comprising:

identifying a first style in which the device groups are organized in the first system; and modifying, in the network model, at least one aspect of the first style such that the network model includes a second style in which the migrated device groups are organized in the second system;

wherein the first style includes a folder-structure based organization and the second style includes a tag-based organization.

4. The method of claim 1, wherein:

the populating the second system includes running an application programming interface (API) against the network model; and the group structure data includes file structure data in which each of the device groups is organized into a subfolder of a file structure.

5. The method of claim 1, further comprising:

parsing one or both of the scraped device data and the scraped group structure data to generate the exportable data file and to identify the device groups; and obtaining credentials from the first system, wherein the parsing the scraped device data and the scraped group structure data is performed using the obtained credentials.

6. The method of claim 1, wherein:

the first system includes an on-premises system deployed at two or more locations; and the group structure data includes a first folder related to a first location of the two or more locations and a second folder related to a second location of the two or more locations.

7. The method of claim 1, wherein the device data include one or more or a combination of: a device name; a device serial number; a device manufacturer; a device location; a device asset tag; a device product; and a device record for each of the managed devices.

8. The method of claim 1, further comprising:

identifying one or more group-specific management configurations for each of the identified device groups, wherein the network model includes associations between the group-specific management configurations and the identified device groups; and building updated group-specific management configurations for the second system based on the group-specific management configurations.

9. The method of claim 1, wherein:

the first system includes a first mobile device management (MDM) system;

the network includes a supply chain management network; and the second system includes a second MDM system.

10. The method of claim 1, wherein:

the scraping the device data and the group structure data includes remotely implementing a migration tool from a cloud server; and the building the network model includes:

generating a tree structure based on the group structure data; and assigning each of the managed devices to at least one portion of the tree structure.

11. A non-transitory computer-readable medium having encoded therein programming code executable by one or more processors to perform or control performance of operations of device management system migration, the operations comprising automatically and without user intervention:

scraping, by a migration module, device data and group structure data from a first system by sending a plurality of queries to the first system and gathering the device data and the group structure data based on responses to the plurality of queries, wherein:

the first system is implemented to at least partially manage a network of managed devices, management of the network is being transitioned from the first system to a second system, and the group structure data is indicative of an arrangement and organization of the managed devices in the network;

identifying, by the migration module, device groups of the network based on the group structure data;

building a network model that is representative of the arrangement of the network based on the identified device groups, wherein the network model replicates or substantially replicates the device groups of the network;

populating, by the migration module, the second system with the device groups of the network model such that the second system includes two or more migrated device groups that correspond to the identified device groups of the first system;

generating, by the migration module, an exportable data file based on the device data, wherein the exportable data file includes a device group identifier for each of the managed devices;

communicating, by the migration module, the exportable data file to the second system to cause the second system to organize the managed devices into the migrated device groups of the second system based on the device group identifiers of the exportable data file; and after the managed devices are organized by the second system into the migrated device groups, causing, by the migration module, a provisioning of the managed devices from management by the first system to management by the second system, wherein the causing the provisioning includes:

sending an update communication to a local client running on the managed devices;

establishing a communication channel with the second system by the managed devices to cause management configurations and attributes to be communicated from the second system to the managed devices; and initiating, by the managed devices, a reboot operation, wherein:

each of the managed devices establishes the communication channel with the second system and receives management configurations from the second system consistent with the migrated device groups into which the managed device is included, and the second system is populated and the exportable data file is communicated before management of the network by the first system ceases such that the provisioning of the managed devices occurs with substantially no interruption of management of the network.

12. The non-transitory computer-readable medium of claim 11, wherein:

the identified device groups include a first device group that includes a first subset of the managed devices and a first group-specific management configuration that is applied to the first subset and a second device group that includes a second subset of managed devices and a second group-specific management configuration that is applied to the second subset;

the migrated device groups include a first migrated device group that includes the first subset and a second migrated device group that includes the second subset of managed devices; and after the provisioning of the managed devices, the first subset is configured according to the first group-specific management configuration and the second subset of managed devices is configured according to the second group-specific management configuration.

13. The non-transitory computer-readable medium of claim 11, wherein the operations further comprise:

identifying a first style in which the device groups are organized in the first system; and modifying, in the network model, at least one aspect of the first style such that the network model includes a second style in which the migrated device groups are organized in the second system;

wherein the first style includes a folder-structure based organization and the second style includes a tag-based organization.

14. The non-transitory computer-readable medium of claim 11, wherein:

the populating the second system includes running an application programming interface (API) against the network model; and the group structure data includes file structure data in which each of the device groups is organized into a subfolder of a file structure.

15. The non-transitory computer-readable medium of claim 11, wherein the operations further comprise:

parsing one or both of the scraped device data and the scraped group structure data to generate the exportable data file and to identify the device groups; and obtaining credentials from the first system, wherein the parsing the scraped device data and the scraped group structure data is performed using the obtained credentials.

16. The non-transitory computer-readable medium of claim 11, wherein:

the first system includes an on-premises system deployed at two or more locations; and the group structure data includes a first folder related to a first location of the two or more locations and a second folder related to a second location of the two or more locations.

17. The non-transitory computer-readable medium of claim 11, wherein the device data include one or more or a combination of: a device name; a device serial number; a device manufacturer; a device location; a device asset tag; a device product; and a device record for each of the managed devices.

18. The non-transitory computer-readable medium of claim 11, wherein the operations further comprise:

identifying one or more group-specific management configurations for each of the identified device groups, wherein the network model includes associations between the group-specific management configurations and the identified device groups; and building updated group-specific management configurations for the second system based on the group-specific management configurations.

19. The non-transitory computer-readable medium of claim 11, wherein:

the first system includes a first mobile device management (MDM) system;

the network includes a supply chain management network; and the second system includes a second MDM system.

20. The non-transitory computer-readable medium of claim 11, wherein:

the scraping the device data and the group structure data includes remotely implementing a migration tool from a cloud server; and the building the network model includes:

generating a tree structure based on the group structure data; and assigning each of the managed devices to at least one portion of the tree structure.

* * * * *